United States Patent
Zhang et al.

(10) Patent No.: US 12,323,360 B2
(45) Date of Patent: Jun. 3, 2025

(54) UPLINK CODEWORD TO LAYER MAPPING AND PHASE TRACKING REFERENCE SIGNALING

(71) Applicant: Apple Inc., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Hong He, Cupertino, CA (US); Huaning Niu, Cupertino, CA (US); Oghenekome Oteri, Cupertino, CA (US); Seyed Ali Akbar Fakoorian, Cupertino, CA (US); Wei Zeng, Saratoga, CA (US); Weidong Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 17/441,249

(22) PCT Filed: Jul. 28, 2021

(86) PCT No.: PCT/CN2021/109062
§ 371 (c)(1),
(2) Date: Sep. 20, 2021

(87) PCT Pub. No.: WO2023/004646
PCT Pub. Date: Feb. 2, 2023

(65) Prior Publication Data
US 2023/0035992 A1     Feb. 2, 2023

(51) Int. Cl.
*H04L 5/00* (2006.01)
*H04W 72/044* (2023.01)

(52) U.S. Cl.
CPC ....... *H04L 5/0053* (2013.01); *H04W 72/0466* (2013.01)

(58) Field of Classification Search
CPC .............. H04L 5/0053; H04L 5/0023; H04W 72/0466; H04W 72/231; H04W 72/1268
See application file for complete search history.

(56) References Cited

U.S. PATENT DOCUMENTS

| 2010/0027697 | A1 | 2/2010 | Malladi et al. |
| 2012/0314678 | A1* | 12/2012 | Ko ........................ H04W 72/21 370/329 |
| 2019/0149205 | A1* | 5/2019 | Kim ..................... H04B 7/0404 375/267 |

FOREIGN PATENT DOCUMENTS

| CN | 102318222 | 1/2012 |
| CN | 102484520 | 5/2012 |
| CN | 107370591 | 11/2017 |

(Continued)

OTHER PUBLICATIONS

International Patent Application No. PCT/CN2021/109062, International Preliminary Report on Patentability, Feb. 8, 2024, 6 pages.

(Continued)

*Primary Examiner* — Marisol Figueroa
(74) *Attorney, Agent, or Firm* — Kilpatrick Townsend & Stockton LLP

(57) ABSTRACT

The present application relates to devices and components including apparatus, systems, and methods for mapping codewords to transmission layers and transmitting phase tracking reference signals in wireless networks.

12 Claims, 10 Drawing Sheets

(56) References Cited

FOREIGN PATENT DOCUMENTS

| WO | WO-2010093194 A2 | * | 8/2010 | ........... H04L 1/0029 |
| WO | WO-2021184296 A1 | * | 9/2021 | |

OTHER PUBLICATIONS

3rd Generation Partnership Project; Technical Specification Group Radio Access Network; NR; Physical channels and modulation (Release 16), 3GPP TS 38.211 V16.6.0, Jun. 2021, 134 pages.

3rd Generation Partnership Project; Technical Specification Group Radio Access Network; NR; Multiplexing and channel coding (Release 16), 3GPP TS 38.212 V16.6.0, Jun. 2021, 153 pages.

3rd Generation Partnership Project; Technical Specification Group Radio Access Network; NR; Physical layer procedures for data (Release 16), 3GPP TS 38.214 V16.6.0, Jun. 2021, 173 pages.

3rd Generation Partnership Project; Technical Specification Group Radio Access Network; NR; Medium Access Control (MAC) protocol specification (Release 16), 3GPP TS 38.321 V16.5.0, Jun. 2021, 157 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

International Patent Application No. PCT/CN2021/109062, International Search Report and Written Opinion, Mailed on Apr. 26, 2022, 13 pages.

\* cited by examiner

600

Receiving, from gNB, configuration information to indicate at least two codewords are enabled for uplink transmissions
604

Receiving scheduling information
608

Mapping codewords to transmission layers
612

Transmitting codewords on mapped transmission layers
616

Figure 6

700 

```
┌─────────────────────────────────────────────────────────────┐
│  Determining a plurality of PTRS ports are scheduled        │
│                         704                                  │
└─────────────────────────────────────────────────────────────┘
                              │
                              ▼
┌─────────────────────────────────────────────────────────────┐
│ Identifying one or more codewords respectively associated   │
│              with one or more MCSs                           │
│                         708                                  │
└─────────────────────────────────────────────────────────────┘
                              │
                              ▼
┌─────────────────────────────────────────────────────────────┐
│ Determining one or more densities for PTRS ports based on   │
│                      the MCSs                                │
│                         712                                  │
└─────────────────────────────────────────────────────────────┘
                              │
                              ▼
┌─────────────────────────────────────────────────────────────┐
│ Providing PTRSs on the PTRS ports with the one or more      │
│                     densities                                │
│                         716                                  │
└─────────────────────────────────────────────────────────────┘
```

Figure 7

UPLINK CODEWORD TO LAYER MAPPING AND PHASE TRACKING REFERENCE SIGNALING

CROSS-REFERENCES TO RELATED APPLICATIONS

This application is a U.S. National Stage Application of PCT/CN2021/109062 filed Jul. 28, 2021. The disclosure of which is herein incorporated by reference in its entirety for all purposes.

BACKGROUND

Third Generation Partnership Project (3GPP) Technical Specifications (TSs) define standards for wireless networks. These TSs describe aspects related to control channels and reference signals that may be transmitted in the wireless networks.

BRIEF DESCRIPTION OF THE DRAWINGS

FIG. 6 illustrates an operational flow/algorithmic structure in accordance with some embodiments.

FIG. 7 illustrates another operational flow/algorithmic structure in accordance with some embodiments.

DETAILED DESCRIPTION

Figure 1:
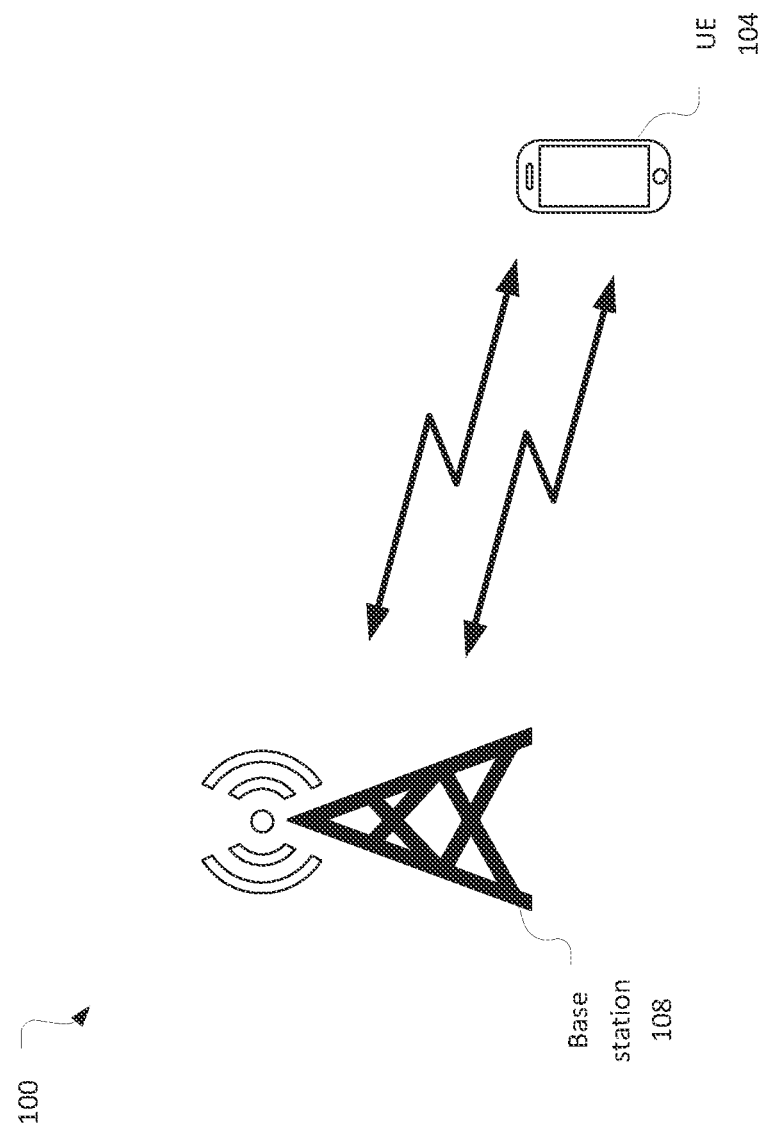
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base station such as, for example, base station 108. The UE 104 and the base station 108 may communicate over air interfaces compatible with 3GPP TSs such as those that define Long Term Evolution (LTE) or Fifth Generation (3G) new radio (NR) system standards. The base station 108 may be an evolved node B (eNB) to provide one or more Long Term Evolution (LTE) evolved universal terrestrial radio access (E-UTRA) cells to provide E-UTRA user plane and control plane protocol terminations toward the UE 104; or next generation node B (gNB) to provide one or more 5G New Radio (NR) cells to provide NR user plane and control plane protocol terminations toward the UE 104.

The base station 108 may provide one or more cells using a carrier aggregation (CA) deployment. The cells may include a primary serving cell (PCell) to provide some or all of the control signaling through signaling radio bearers (SRBs) and one or more secondary serving cells (SCells) to provide one or more data radio bearers (DRBs) to increase throughput capability of the system. A PCell may be configured on a primary component carrier (PCC) and the SCells may be configured on secondary component carriers (SCCs).

Data and control signaling is communicated between the UE 104 and the base station 108 via various physical channels. In the downlink, the base station 108 may transmit control signaling in a physical downlink control channel (PDCCH), data in a physical downlink shared channel (PDSCH), and system information for access to a cell in a physical broadcast channel (PBCH). In the uplink, the UE 104 may transmit control signaling in a physical uplink control channel (PUCCH), data in a physical uplink shared channel (PUSCH), random access preambles in a physical random access channel (PRACH).

Various reference signals are also transmitted in both the uplink and downlink direction to facilitate network communication.

Downlink reference signals include demodulation reference signals (DMRSs), phase tracking-reference signals (PTRSs), tracking reference signals (TRSs), and channel state information-reference signals (CSI-RSs). DMRSs are used to estimate a radio channel to facilitate modulation. PTRSs are used to estimate and compensate phase noise and frequency offset. TRSs allow the UE 104 to track time/frequency variation with a high resolution. CSI-RSs are multi-purpose signals used for channel state information reporting, beam management, connected mode mobility, radio link failure detection, beam failure detection and recovery, and fine tuning of time and frequency synchronization.

Uplink reference signals include DMRSs. PTRSs, and sounding reference signals (SRSs). The DMRSs and the PTRSs serve similar functions in the uplink as they do in the downlink. SRSs allow the base station 108 to measure the uplink propagation channel. These measurements may allow the base station 108 to perform uplink channel aware scheduling and link adaptation, estimate a downlink propagation channel when channel reciprocity exists, provide uplink beam management, and provide codebook-based and non-codebook-based transmissions.

Non-codebook-based transmissions may involve the UE 104 transmitting a number of SRSs precoded with a corresponding number of precoding weights. The base station 108 may then transmit an SRS indicator (SRI) to the UE 104 to identify one of the SRSs. The UE 104 may use the precoding weights used to transmit the identified SRS for transmitting a scheduled PUSCH transmission.

Codebook-based transmissions may involve the UE 104 for transmitting non-precoded SRSs that the base station 108 uses to determine various parameters for uplink transmissions. The base station 108 may select antenna ports, number of transmission layers (which may also be referred to as "rank"), and precoding weights that are to be used for a PUSCH transmissions based on the SRSs. The base station 108 may then transmit indications of the selected parameters to the UE 104.

In the uplink direction, the UE 104 may perform a channel coding on user data to generate a codeword, which is then mapped to one or more transmission layers. In LTE, one or two codewords are supported for uplink transmission. If two codewords are to be transmitted by N transmission layers, the first ceil(N/2) layers are mapped to the first codeword and the remaining layers are mapped to the second codeword, where the expression "ceil (N/2)" refers to the smallest integer value that is equal to or greater than N/2. Thus, the layers are split with a first set of consecutive layers being mapped to the first codeword and a second set of consecutive layers being mapped to the second codeword. The first and second sets are approximately evenly split; however, the first set will include an additional layer in the event there are an odd number of layers. This mapping scheme may be referred to as a consecutive layer split (CLS) mapping scheme.

In current NR networks, only one codeword is supported for uplink transmissions. The one codeword may be transmitted on up to four transmission layers. The signal-to-noise-and-interference ratio (SINR) for each transmission layer may be different. Thus, system performance may be improved by using more than one codeword and mapping different layers to different codewords. This may allow the base station 108 to indicate different modulation and coding schemes (MCSs) for different codewords and may further allow the base station 108 to indicate retransmission for a particular codeword. Instead of introducing two codewords, layer or layer-group specific MCS may be used.

Figure 2:
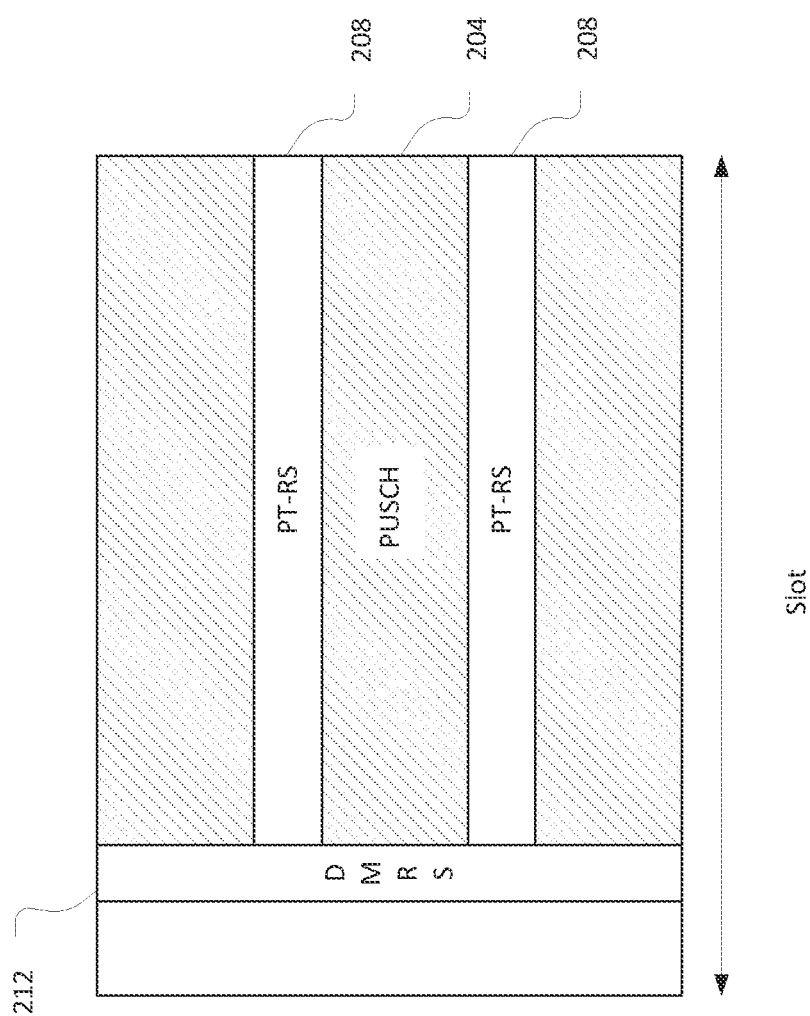
FIG. 2 illustrates transmission resources in accordance with some embodiments.

FIG. 2 illustrates transmission resources 200 of a slot in accordance with some embodiments. The transmission resources 200 may include a PUSCH 204, a PTRS 208, and a DMRS 212.

As briefly introduced above, the DMRS 212 may provide a receiver with the ability to perform demodulation of physical channels based on a channel estimate from the DMRS 212.

The DMRS 212 may be Type I, which supports two code-division multiplexing (CDM) groups, or Type II, which supports three CDM groups. Further. DMRSs transmitted by up to two antenna ports may be multiplexed in one CDM group by using orthogonal cover codes in the frequency domain. Thus, the DMRS 212, illustrated on one orthogonal frequency division multiplexing (OFDM) symbol, may represent DMRSs transmitted by up to six antenna ports. As used herein, an antenna port of a DMRS may be referred to as a DMRS port.

A DMRS port may be associated with an antenna port used to transmit the PUSCH (or "PUSCH port") such that a DMRS transmitted by the DMRS port is precoded in the same way as a PUSCH transmission transmitted by the PUSCH port.

The PTRS 208 may be transmitted to allow the base station 108 to estimate and compensate for both phase noise from non-ideal oscillators and frequency offsets from non-ideal oscillators and Doppler shifts due to mobility. The PTRS 208 is typically denser in the time domain than in the frequency domain given that phase noise may change as a function of time but remain relatively constant as a function of frequency. The PTRS 208 together with the DMRS 212 may be used to identify rate of rotation of a modulation constellation caused by frequency offsets. The time density of the PTRS 208 may refer to the time domain spacing between symbols allocated to the PTRS 208. The time density may be based on the scheduled MCS as described in clause 6.2.3.1 of 3GPP TS 38.214 v16.6.0 (2021 June). In some embodiments, the time domain density of PTRS may set the PTRS to be on every symbol, every other symbol, or every fourth symbol.

The UE 104 may include a plurality of antenna panels that either share a single local oscillator or have separate local oscillators. If the antenna panels share a single local oscillator, it may be sufficient to transmit the PTRS 208 using a single antenna port. If the antenna panels have different local oscillators, it may be desired to transmit the PTRS using different antenna ports. In some embodiments, the PTRS 208 may be transmitted using one or two ports; however, in other embodiments, additional ports may be used.

To facilitate phase tracking at a receiver, each antenna port of PTRS (or simply "PTRS port") may be associated with a DMRS port. The PTRS port and associated DMRS port may share the same quasi-co-location (QCL) property with regard to Doppler offset, Doppler shift, frequency offset, frequency shift, and spatial receive (Rx) parameter. The DMRS ports (or transmission layers) that share the same PTRS port may be assumed to be transmitted from the same antenna panel.

The UE 104 may be configured with one- or two-port PTRS that is associated with a PUSCH transmission. When two-port PTRS is enabled for a codebook-based transmission, PUSCH ports 1000 and 1002 may share one antenna panel, while PUSCH port 1001 and 1003 may share the other antenna panel. When two-port PTRS is enabled for a non-codebook-based transmission, the PTRS port index may be provided by configuration information of an SRS indicated by an SRI. Then the PUSCH port associated with the SRS resources that share the same PTRS port index can be assumed to be with the same panel. For example, the base station 108 may transmit, in DCI, an SRI that identifies an SRS resource configuration. The SRS resource configuration may include one or more PTRS indices that respectively correspond to one or more PTRS ports. Then the UE 104 may determine that the PUSCH ports that are associated with the SRS resources provided by the resource configuration are mapped to the one or more PTRS ports in the SRS resource configuration.

When two-port PTRS is used with two panels, each PTRS port may be associated with a respective panel. Thus, references to PTRS port-to-layer mapping as used herein may also be referred to as panel/PTRS port-to-layer mapping.

As briefly discussed above, it may be advantageous to support more than one codeword for uplink transmissions in NR networks. Further, since the SINR for signals from different UE panels may be quite different, it may be advantageous to transmit the codewords with different MCSs by different antenna panels. This may complicate operation in NR networks. For example, the codeword-to-layer mapping scheme from LTE does not reflect different link budgets for the different panels. Additionally, for the single PTRS port case, determining the DMRS port and the PTRS time domain pattern may be an issue when two codewords/MCSs are scheduled. Thus, embodiments describe uplink codeword-to-layer mapping and PTRS transmission concepts to improve operations in these scenarios. Some embodiments describe codeword-to-layer mapping or layer(s) specific MCS with regard to different panel status and layer-to-panel mapping. Additional embodiments describe determining and utilizing PTRS time domain density and associated DMRS port selection when more than one codewords/MCSs are indicated.

Figure 3:
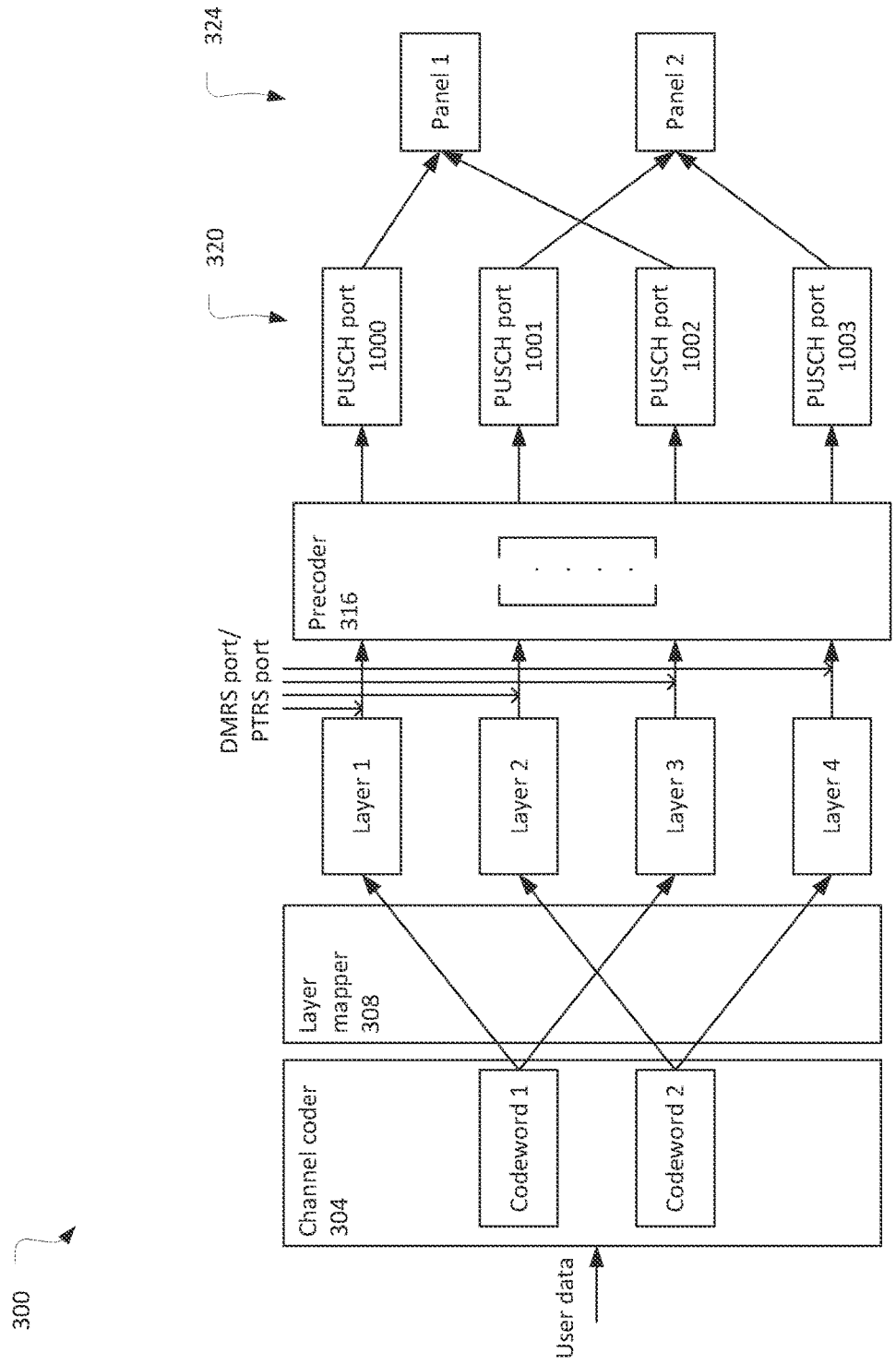
FIG. 3 illustrates transmission components in accordance with some embodiments.

FIG. 3 illustrates transmission components 300 of the UE 104 in accordance with some embodiments. The transmission components 300 illustrated in FIG. 3 describe a subset of components involved with physical processing that may be employed by the UE 104 for uplink transmissions. The UE 104 may include a number of other components that perform other physical processing in conjunction with those shown.

The transmission components 300 may include a channel coder 304 that receives user data and generates a plurality of codewords that respectively correspond to a plurality of transport blocks. As shown, the channel coder 304 may generate two codewords, codeword 1 and codeword 2. In other embodiments, other numbers of codewords may be generated. The channel coder 304 may generate the codewords using a low-density parity check (LDPC) coding for the PUSCH. In other embodiments, other coding schemes may be used.

The transmission components 300 may further include a layer mapper 308 that maps codewords to transmission layers according to a multiple input multiple output (MIMO) rank. As shown, the layer mapper 308 may map codewords 1-2 to four layers, layers 1-4. In particular, the layer mapper 308 may map codeword 1 to layers 1 and 3 and may map codeword 2 to layers 2 and 4.

As used herein, each codeword may be considered as layers that share the same MCS. Thus, the codeword-to-layer mapping may also be referred to as codeword/MCS-to-layer mapping.

Following the layer mapping. PTRSs and DMRSs may be added through respective PTRS ports and DMRS ports. The signals may then be provided to a precoder 316 that provides precoding for MIMO and digital beamforming. The precoder 316 may apply a precoding matrix with various precoding weights to the layers to distribute weighted signals to a plurality of PUSCH ports 320. For example, if the precoder 316 applies a precoder [x 0 y 0]T to a PTRS port, where x and y are non-zero weights, the PTRS port may be mapped to PUSCH ports 1000 and 1002 for transmission. Said another way, the PUSCH port 1000 and 1002 may share the same PTRS port.

Each of the PUSCH ports may correspond to a respective transmitter or radio frequency (RF) chain. The PUSCH ports 320 are shown to include four PUSCH ports, PUSCH port 1000, PUSCH port 1001, PUSCH port 1002, and PUSCH port 1003. In other embodiments, other numbers of PUSCH ports may be used.

Individual PUSCH ports may be mapped to one of a plurality of antenna panels 324 including, for example, panel 1 and panel 2. The antenna panels 324 may include an array of antenna elements for transmission of the signal.

This disclosure provides a number of options for codeword-to-layer mapping in the event RRC signaling enables a plurality of codewords. The number of codewords that the UE 104 is to use may be configured per UE, serving cell, bandwidth part, or control resource set (CORESET). In the event the number of codewords is configured per CORESET, the base station 108 may dynamically switch between single-codeword and multi-codeword (for example, using more than one codeword) using, for example, downlink control information (DCI) in the PDCCH. In some embodiments, the UE 104 may signal, to the base station 108, whether the UE 104 supports more than one codeword.

Figure 4:
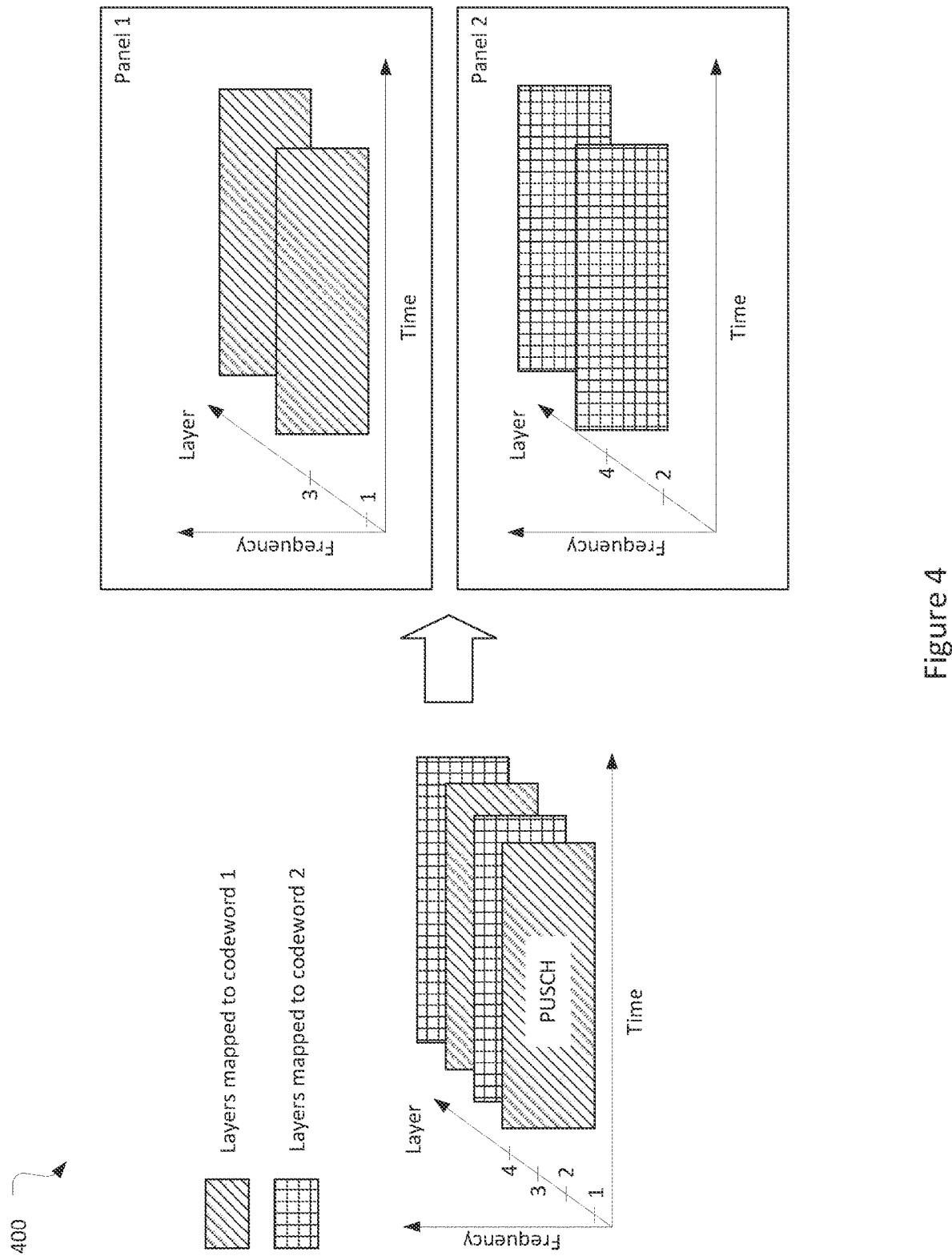
FIG. 4 illustrates a mapping operation in accordance with some embodiments.

FIG. 4 illustrates a mapping operation 400 in accordance with an embodiment. The mapping operation 400 may illustrate a first option, referred to as mapping option 1, in which codeword-to-layer mapping is determined by layer-to-PTRS port mapping. The layer mapper 308 may receive information that provides the layer-to-PTRS port mapping and may map the codewords to the layers based on the received information. Consider, for example, that the layer mapper 308 determines that: a first PT-RS port is mapped to layers 1 and 3; codeword 1 is associated with the first PT-RS port; a second PTRS port is mapped to layers 2 and 4; and codeword 2 is associated with the second PTRS port. In this case, the layer mapper 308 may map codeword 1 to layers 1 and 3, which may be transmitted by antenna panel 1; and may map codeword 2 to layers 2 and 4, which may be transmitted by antenna panel 2 as shown in FIG. 4. The layer mapper 308 may receive the information that provides the layer-to-PTRS port mapping according to one of the following suboptions.

In a first suboption, referred to as option 1-1, the layer-to-PTRS port mapping may be configured by higher-layer signaling. For example, the base station 108 may transmit RRC or MAC CE signaling that associates a PTRS port with one or more layers.

In a second suboption, referred to as option 1-2, the layer-to-PTRS port mapping may be determined based on potential PUSCH ports that can shame the same PTRS port. For codebook-based transmission, layers mapped to PUSCH port 1000 and 1002 may share one panel/PTRS port, while layers mapped to PUSCH port 1001 and 1003 may share the other panel/PTRS port. For non-codebook-based transmission, the PTRS port index provided by the SRI and PUSCH ports associated with the SRS resources that share the same PTRS port index may be assumed to be associated with the same panel/PTRS port.

In a second option, referred to as mapping option 2, codeword-to-layer mapping may be determined by layer-to-antenna port mapping. The layer mapper 308 may receive information that provides the layer-to-antenna port mapping and may map the codewords to the layers based on the received information.

For example, the layers mapped to a first polarization may be associated with a first codeword/MCS and remaining layers may be associated with a second codeword/MCS. Consider, for example, that PUSCH ports 1000 and 1001 are mapped to antenna elements of panels 1 and 2 that have a first polarization and PUSCH ports 1002 and 1003 are mapped to antenna elements of panels 1 and 2 that have a second polarization. The layer mapper 308 may determine the layers 1 and 3 are mapped to PUSCH ports 1000 and 1001 and may, therefore, map codeword 1 to layers 1 and 3. Conversely, the layer mapper 308 may determine that layers 2 and 4 are mapped to PUSCH ports 1002 and 1003 and may, therefore, map codeword 2 to layers 2 and 4.

In some embodiments, the UE 104 may use one of a plurality of available codeword-to-layer mapping schemes to perform the layer mapping. The available codeword-to-layer mapping schemes may include a CLS mapping scheme; a PTRS port based mapping scheme (mapping option 1); or an antenna port based mapping scheme (mapping option 2). Selection of the mapping scheme to use from the available mapping schemes may be performed as described as follows with respect to third and fourth options.

In a third option, referred to as option 3, selection of codeword-to-layer mapping may be configured by signaling from the base station 108. The signaling may be, for example, RRC or scheduling DCI. In some embodiments, the signaling may indicate which of a plurality of available codeword-to-layer mapping schemes are to be used.

Figure 5:
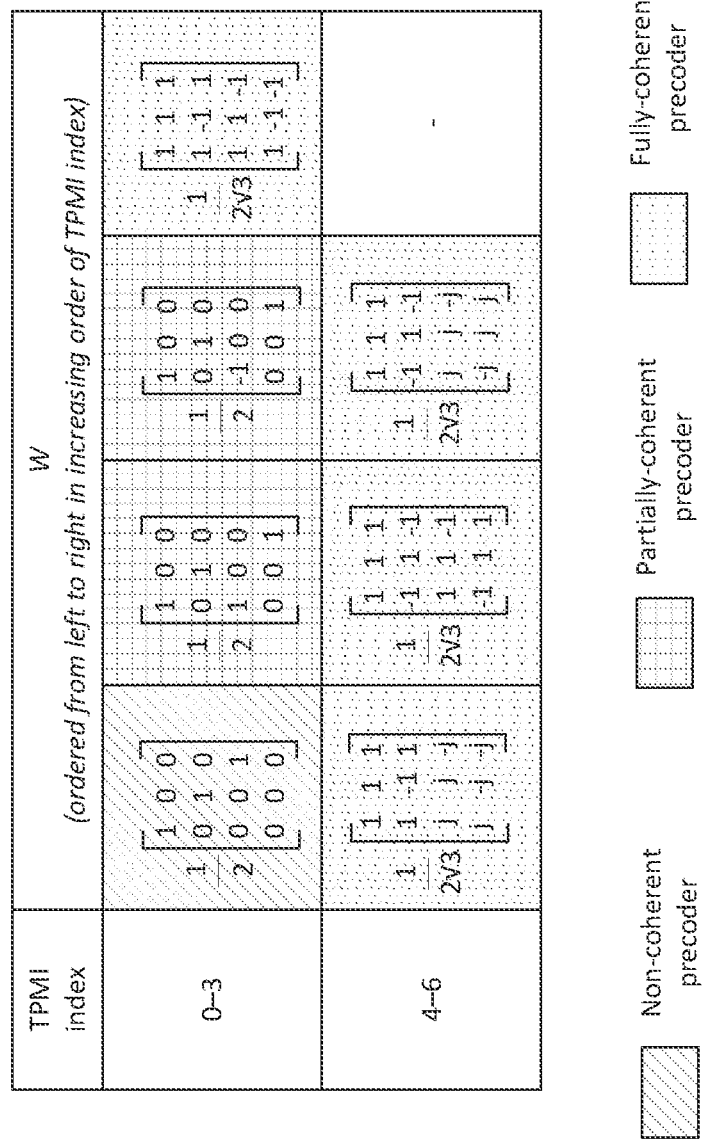
FIG. 5 illustrates a codebook that may be used in various embodiments.

In a fourth option, the codeword-to-layer mapping may be determined based on precoder information or SRI for a PUSCH transmission. For an example in which codebook-based transmission is configured, the UE 104 may receive an indication of a precoder from the base station 108. The base station 108 may transmit the precoder information (for example, a transmitted precoding matrix indicator (TPMI) index), along with an indication of a number of layers, in DCI that schedules the PUSCH transmission (for example, DCI format 0_1). The TPMI index may identify one of the precoders from a codebook, such as codebook 500 of FIG. 5 in accordance with some embodiments. The precoders in codebook 500 may correspond to an embodiment in which the PUSCH transmission is transmitted by up to three transmission layers (indicated by the three columns of a given precoder) via up to four antenna ports (indicated by the four rows of a given precoder). The precoders in codebook 500 may be either a non-coherent precoder, a partially-coherent precoder, or a fully-coherent precoder. A non-coherent precoder may be used when the UE 104 is not able to control a relative phase of signals transmitted by non-coherent antenna ports. A fully-coherent precoder may be used when the UE 104 is able to control a relative phase of signals transmitted by coherent antenna ports. And a partially-coherent precoder may be used when the antenna ports include both coherent and non-coherent antenna ports.

In one example, if the TPMI index indicates a non-coherent or partially-coherent based precoder is to be used for the PUSCH transmission, the UE 104 may use the PTRS port based mapping scheme (mapping option 1); or the antenna port based mapping scheme (mapping option 2). If the TPMI index indicates a fully-coherent based precoder, the UE 104 may use the CLS mapping scheme.

In an embodiment that uses a non-codebook-based transmission for the PUSCH, the UE 104 may assume that it is a fully-coherent transmission. Thus, in some embodiments, the UE 104 may use the CLS mapping scheme for non-codebook-based transmissions.

In some embodiments, the UE 104 may report whether a non-codebook-based PUSCH transmission is to be assumed as based on a fully-coherent transmission or a non-coherent/partially-coherent transmission. The UE 104 may then use either the CLS mapping scheme or PTRS/antenna port based mapping scheme according to the coherency assumption.

In some embodiments, the base station 108 may indicate the codeword/MCS index for each SRS resource for non-codebook-based transmission. The layer mapper 308 may then map the layers that share the same codeword/MCS to the same codeword/MCS. For example, the base station 108 may set the SRS resource configurations to indicate codeword index=1 for SRS 1 and 3, and codeword index=2 for SRS 2. Then, if the signaled SRI(s) correspond to SRSs 1, 2, and 3, the layers 1 and 3 will be for codeword 1 and layer 2 will be for codeword 2.

Determining time domain density for PTRSs transmitted by N-ports and selecting associated DMRS port when M codewords/MCSs are indicated is described as follows.

If the number of indicated codewords/MCSs is less than or equal to the number of PTRS ports, e.g., M<=N, each PTRS port may be mapped one-to-one or K-to-one to a codeword/MCS. The selection of the time-domain density for the PTRS may then be determined as follows.

For each PTRS port, the PTRS time domain density may be determined by an associated MCS. For example, if PTRS ports 1 and 2 are mapped to codeword 1 in a K-to-one mapping, the MCS of codeword 1 may be used to determine the time-domain density of the PTRSs transmitted by both PTRS ports 1 and 2.

In another option, a common PTRS time domain density may be applied for all PTRS ports. The common density may be based on the lowest or highest MCS of the codewords. For example, if PTRS port 1 is mapped to codeword 1 and PTRS port 2 is mapped to codeword 2, then the lowest/highest MCS associated with codeword 1 and 2 may be used to determine the common PTRS time domain density. The common PTRS time domain density may be used for transmitting the PTRS from both PTRS ports 1 and 2.

In some embodiments, an equivalent MCS across layers may be used to determine the PTRS time domain density. An equivalent MCS may be calculated based on an actual spectrum efficiency (SE). The MCS with the closest SE may be used as the equivalent MCS. In one example, the actual SE can be calculated as $$\frac{\sum_{j=1}^{N} M_j}{U},$$

where $M_j$ indicates the transport block size for codeword j, N indicates the total number of codewords, and U indicates total number of resource elements used for PUSCH across layers. The equivalent MCS can be selected based on the actual SE and a predefined MCS table such as Table 6.1.4.1-1 and Table 6.1.4.1-2 in 3GPP TS 38.214 v16.6.0 (2021 Jun. 30).

In some embodiments, the PTRS-to-DMRS ports indication may be indicated based on the layers mapped to the same codeword/MCS. For example, if X layers are mapped to an associated codeword, the corresponding PTRS may only be associated with one of the X DMRS ports. Referring again to FIG. 3 for one example, if layers 1 and 3 are mapped to codeword 1, a PTRS port that is associated with codeword 1 may be mapped to a DMRS port that corresponds to layer 1 or 3.

If the number of codewords/MCSs is greater than the number of PTRS ports, e.g., M>N, a PTRS port may be mapped one-to-K to a codeword/MCS. The selection of the time-domain density for the PTRS may then be determined as follows.

In one embodiment, for each PTRS port, the PTRS time domain density may be determined by an MCS for the layer for the associated DMRS port. For example, if PTRS port 1 is scheduled with codewords 1 and 2 and PTRS is associated with the first codeword, the PTRS time domain density may be determined by the first codeword. Scheduling PTRS port 1 with both codewords 1 and 2 and associating the PTRS with the first codeword may imply that both codewords share a common phase noise, so one PTRS port may be sufficient. As codeword 1 may have a better performance, the precoder from one layer for codeword 1 may be used to transmit PTRS port 1.

In another embodiment, for each PTRS port, the PTRS time domain density may be determined by the lowest/highest/equivalent MCS from the K MCSs. For example, if a first PTRS port is mapped to two codewords/MCSs, the lowest/highest/equivalent MCS from those two MCSs may be used to determine the time domain density for the first PTRS port.

In another embodiment, a common PTRS time domain density may be applied for all PTRS ports. The lowest/highest/equivalent MCS from the M MCSs may be used to determine the PTRS time domain density. Consider, for example, a two-port PTRS scenario in which a first PTRS port is mapped to a first set of one or more codewords/MCSs and a second PTRS port is mapped to a second set of one or more codewords/MCSs. In this scenario, the lowest/highest/equivalent MCS from all MCSs from the first and second sets may be used to determine the time-domain density for the both the first and second PTRS ports.

In some embodiments, the PTRS-to-DMRS port indication for scenarios in which one PTRS port is mapped to K codewords/MCSs, e.g., when M>N, may be as follows.

In a first option, the PTRS port may be associated with one of the X layers mapped to the K codewords/MCSs. Consider, for example, that a PTRS port is mapped to codewords 1 and 2, which are, in turn, mapped to four layers as shown in FIG. 3. The PTRS port may be associated with a DMRS port that corresponds to one of the four layers. The associated layer may be determined based on an associated layer index from the X layers provided by the base station 108 in DCI.

In a second option, the PTRS port may be associated with one of the layers mapped to one of the K codewords/MCSs. In one example, the base station 108 may indicate the associated layer index from the layers mapped to the selected codeword/MCS by DCI. The codeword/MCS selection may be determined as follows.

In one embodiment, the codeword/MCS used as a basis for port association of the second option may be configured by the base station 108 through higher layer signaling or DCI.

In another embodiment, the codeword/MCS used as a basis for port association of the second option may be selected based on the one with the highest/lowest MCS. For the codewords that share the same MCS, the one with the lowest codeword index or the one mapped to the lowest layer index may be selected. For example, if one PTRS port is scheduled with two codewords, the PTRS port may be associated with one of the layers mapped to the codeword with the highest MCS. And, if both codewords share the same MCS, the PTRS port may be associated with one of the layers from the first codeword/MCS.

FIG. 6 illustrates an operation flow/algorithmic structure 600 in accordance with some embodiments. The operation flow/algorithmic structure 600 may be performed or implemented by a user equipment such as, for example, UE 104 or 900; or components thereof, for example, baseband processor 904A.

The operation flow/algorithmic structure 600 may include, at 604, receiving configuration information to indicate at least two codewords are enabled for uplink transmissions. The configuration information may be received from a gNB such as, for example, base station 108. The configuration information may be specifically configured for a UE, serving cell, bandwidth part, or CORESET. The nature of the configuration information may inform how it is received. For example, if the configuration information is specific for a serving cell, the configuration information may be received in the serving cell configuration information.

In some embodiments, the UE implementing the operation flow/algorithmic structure 600 may transmit a capability indication to indicate that the UE supports more than one codeword for uplink transmissions. The configuration information that enables the at least two codewords may be based on this capability indication.

The operation flow/algorithmic structure 600 may further include, at 608, receiving scheduling information. The scheduling information may schedule a PUSCH transmission. In some embodiments, the scheduling information may trigger, or otherwise refer to, the configuration information received at 604.

The operation flow/algorithmic structure 600 may further include, at 612, mapping codewords to transmission layers. The number of codewords and the number of transmission layers may be based on the scheduling information or the configuration information.

The mapping of the codewords to the transmission layers may be based on any of a plurality of available mapping schemes such as those described elsewhere herein. For example, the mapping of the codewords to the transmission layers may be based on a panel/PTRS port-to-layer mapping (e.g., mapping option 1) or a layer-to-antenna port mapping (e.g., mapping option 2). In some embodiments, the mappings of the codewords to the transmission layers may be based on a CLS mapping scheme. In some embodiments, the base station may indicate which mapping scheme the UE is to use. This may be indicated directly in control signaling or by indication of specific transmission configurations (for example, based on precoder information or SRIs provided for the PUSCH transmission).

If the mapping is based on the panel/PTRS port-to-layer mapping, the UE may identify first mappings between PTRS ports and transmission layers, identify second mappings between the codewords and the PTRS ports, and map the codewords to the transmission layers based on the first and second mappings. This may be done in manners similar to that described elsewhere herein with respect to mapping option 1.

In some embodiments, the first mappings may be configured by higher layer signaling or determined by potential PUSCH ports that can share the same PTRS port as described above.

If the mapping is based on the layer-to-antenna port mapping, the UE may identify first mappings between antenna ports and transmission layers, identify second mappings between codewords and transmission layers, and map the codewords to the transmission layers based on the first and second mappings. This may be done in a manner similar to that described elsewhere herein with respect to mapping option 2.

The operation flow/algorithmic structure 600 may further include. 616, transmitting the codewords on the transmission layers to which they are mapped.

FIG. 7 illustrates an operation flow/algorithmic structure 700 in accordance with some embodiments. The operation flow/algorithmic structure 700 may be performed or implemented by a user equipment such as, for example, UE 104 or 900; or components thereof, for example, baseband processor 904A.

The operation flow/algorithmic structure 700 may include, at 704, determining a plurality of PTRS ports are scheduled. In some embodiments, the base station may provide the UE with scheduling information that includes the indication that the plurality PTRS ports are scheduled.

The operation flow/algorithmic structure 700 may further include, at 708, identifying one or more codewords respectively associated with one or more MCSs.

The operation flow/algorithmic structure 700 may further include, at 712, determining density for PTRS ports based on the MCSs.

If the number of scheduled PTRS ports is greater than or equal to the number of codewords/MCSs, the PTRS ports may be mapped one-to-one or K-to-one with the codewords/MCSs. In these embodiments, the time domain density may be determined for each PTRS port based on the associated MCS. Alternatively, a common PTRS time domain density may be applied for all the PTRS ports. The common PTRS time domain density may be the lowest/highest/equivalent MCS.

If the number of scheduled PTRS ports is less than the number of codewords/MCSs, the PTRS ports may be mapped one-to-K with the codewords/MCSs. In these embodiments, the PTRS time domain density may be determined for each PTRS port based on: the MCS for the layer for the associated DMRS port or the lowest/highest/equivalent MCSs from the K MCSs. Alternatively, a common PTRS time domain density may be applied to all PTRS ports. The common PTRS time domain density may be based on the lowest/highest/equivalent MCSs from all the MCSs.

If the number of scheduled PTRS ports is less than the number of codewords/MCSs, the PTRS-to-DMRS ports indication may be as follows. A PTRS may be associated with one of the X layers (or DMRS ports) mapped to the K codewords/MCS. Consider, for example, that a first PTRS port is mapped to first and second codewords/MCSs, with the first codeword to be transmitted on one or more first transmission layers and the second codeword to be transmitted on one or more second transmission layers. In this instance, the first PTRS port may be associated with one transmission layers selected from all transmission layers (including both the first and second transmission layers).

In another option, the PTRS may be associated with one of the layers (or DMRS ports) mapped to one of the K codewords/MCSs. Consider, for example, that a first PTRS port is mapped to first and second codewords/MCSs, with the first codeword/MCSs to be transmitted on one or more first transmission layers and the second codeword/MCSs to be transmitted on one or more second transmission layers. In this instance, the first PTRS port may be associated with one transmission layer selected from either the first transmission layers or the second transmission layers. In some embodiments, the UE may determine whether to select the transmission layer from the first or the second transmission layers based on a codeword/MCS that is configured by the network (e.g., by higher-layer signaling or DCI), selected as the one with the highest/lowest MCS; or, in the event the MCs are equal, the codeword/MCS having the lowest codeword/layer index.

The operation flow/algorithmic structure 700 may further include, at 716, providing PTRSs on the PTRS ports with the one or more densities. The PTRSs may be provided, by baseband circuitry, to RF circuitry for transmission by one or more antenna panels over the air.

Figure 8:
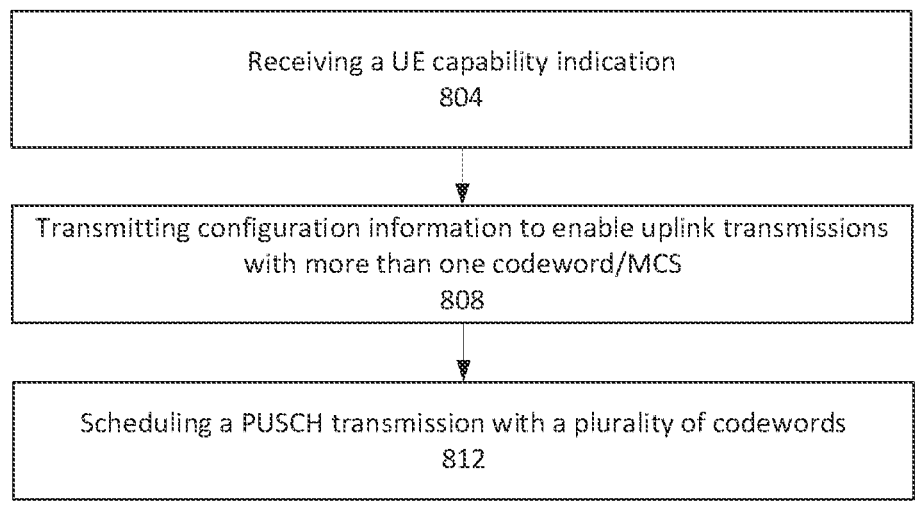
FIG. 8 illustrates another operational flow/algorithmic structure in accordance with some embodiments.

FIG. 8 illustrates an operation flow/algorithmic structure 800 in accordance with some embodiments. The operation flow/algorithmic structure 800 may be performed or implemented by a base station such as, for example, base station 108 or 1000; or components thereof, for example, baseband processor 1004A.

The operation flow/algorithmic structure 800 may include, at 804, receiving a UE capability indication. The capability indication may indicate that the UE is capable of supporting more than one codewords for an uplink transmission.

The operation flow/algorithmic structure 800 may further include, at 808, transmitting configuration information to enable uplink transmissions with more than one codeword/MCS. The configuration information may be transmitted based on the capability indication received at 804.

The operation flow/algorithmic structure 800 may further include, at 812, scheduling a PUSCH transmission with the plurality of codewords to be transmitted on at least two transmission layers.

In some embodiments, the base station may also provide an indication of a codeword-to-layer mapping scheme to use to map the plurality of codewords to the at least two transmission layers. This may be provided in configuration information transmitted at 808 or in the scheduling information transmitted at 812.

Figure 9:
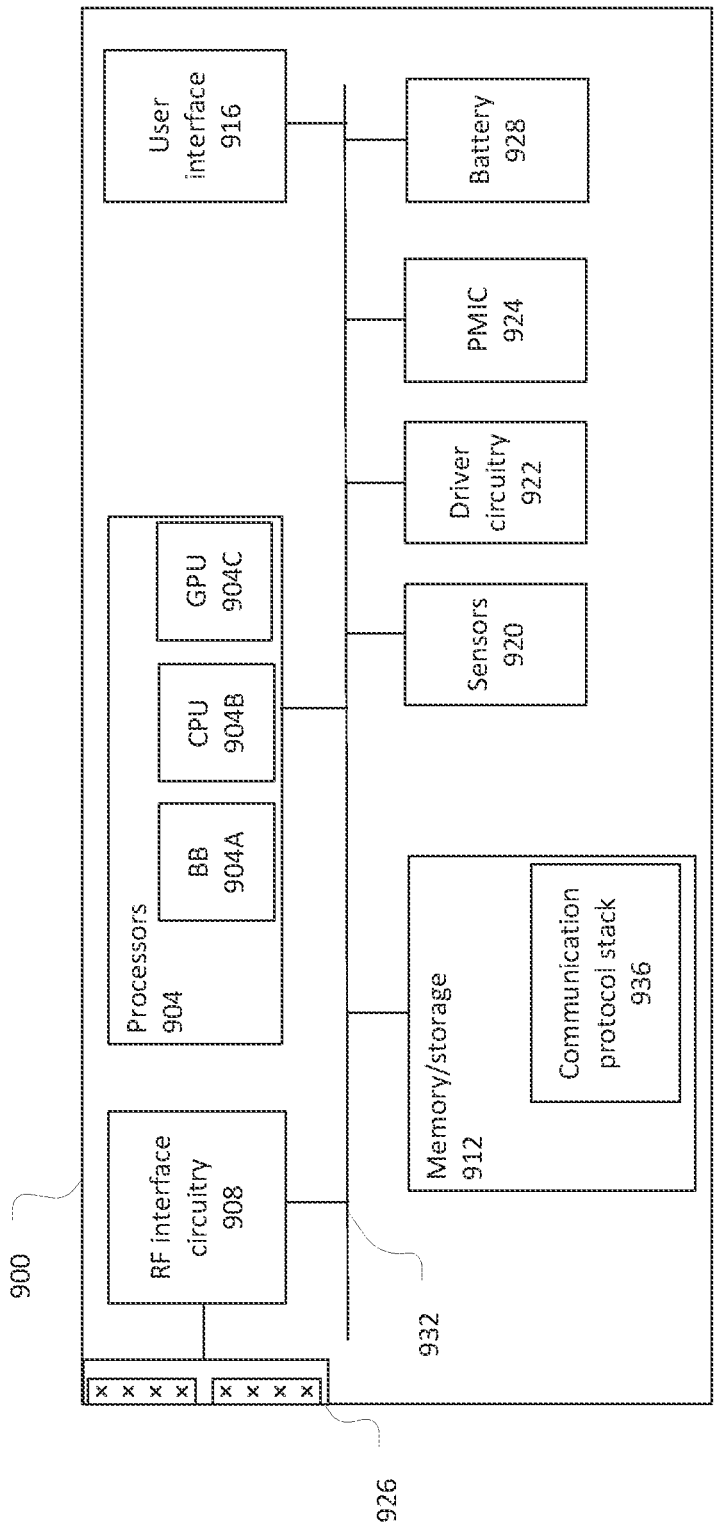
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, or optical connection that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer, and perform control plane functions at a PHY layer, MAC layer, RLC layer, PDCP layer, RRC laver, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
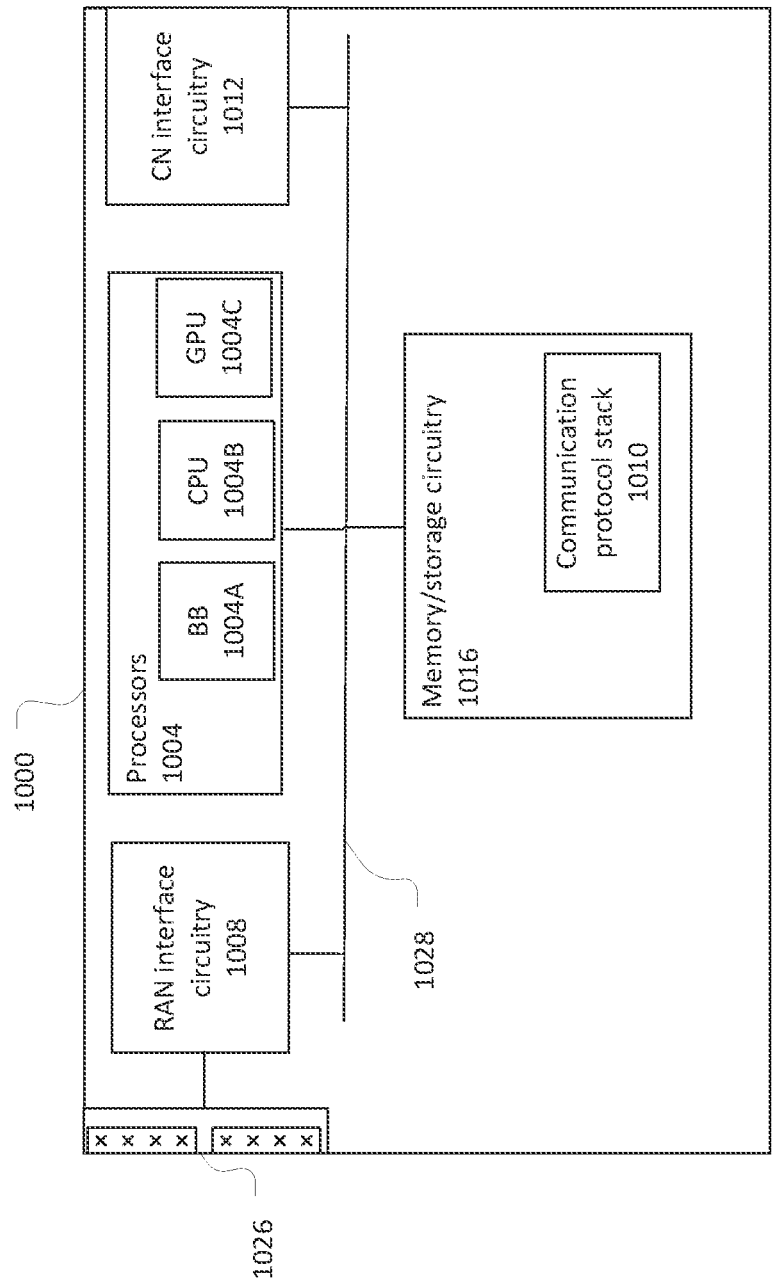
FIG. 10 illustrates a base station in accordance with some embodiments.

FIG. 10 illustrates a base station 1000 in accordance with some embodiments. The base station 1000 may be similar to and substantially interchangeable with base station 108 of FIG. 1.

The base station 1000 may include processors 1004, RF interface circuitry 1008, core network (CN) interface circuitry 1012, memory/storage circuitry 1016, and antenna structure 1026.

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the base station 1000 may be coupled with transmit receive points (TRPs) using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving configuration information from a next generation node B (gNB), the configuration information to indicate at least two codewords are enabled for uplink transmissions; receiving scheduling information to schedule an uplink transmission; mapping, based on the scheduling information and configuration information, a first codeword to a first transmission layer and a second codeword to a second transmission layer; and transmitting the first codeword with the first transmission layer and the second codeword with the second transmission layer.

Example 2 includes the method of example 1, further comprising: mapping the first codeword to a plurality of first transmission layers that includes the first transmission layer; and mapping the second codeword to a plurality of second transmission layers that includes the second transmission layer.

Example 3 includes the method of example 1, wherein the configuration information comprises UE-specific configuration information, serving cell configuration information, bandwidth part configuration information, or control resource set configuration information.

Example 4 includes the method of example 1, further comprising: transmitting a capability indication to indicate that the UE supports more than one codeword for uplink transmissions.

Example 5 includes the method of example 1, further comprising: identifying a first mapping between a first phase-tracking reference signal (PTRS) port and the first transmission layer; identifying a second mapping between the first codeword and the first PTRS port; and mapping the first codeword to the first transmission layer based on the first and second mappings.

Example 6 includes the method of example 5, further comprising: receiving a mapping configuration in radio resource control (RRC) signaling or in a media access control (MAC) control element (CE); and identifying the first mapping based on the mapping configuration.

Example 7 includes the method of example 5, wherein the first mapping is between the first PTRS port and both the first transmission layer and a third transmission layer and identifying the first mapping between the first PTRS port and the first and third transmission layers comprises: determining the first transmission layer is mapped to a first physical uplink shared channel (PUSCH) port; determining the third transmission layer is mapped to a second PUSCH port; and determining the first PTRS port is mapped to both the first and second PUSCH ports.

Example 8 includes the method of example 7, wherein determining the first PTRS port is mapped to both the first and second PUSCH ports comprises: receiving a sounding reference signal (SRS) indicator (SRI) that identifies an SRS resource configuration; determining the SRS resource configuration includes a PTRS index that corresponds to the first PTRS port; and determining that the first PTRS port is mapped to both the first and second PUSCH ports based on a determination that the first and second PUSCH ports are associated with the SRS resources provided by the SRS resource configuration.

Example 9 includes the method of example 7, wherein determining the first PTRS port is mapped to both the first and second PUSCH ports comprises: determining, based on one or more precoding matrixes, the first transmission layer is mapped to the first PUSCH port and the second transmission layer is mapped to the second PUSCH port based on one or more precoding matrixes in a codebook, wherein the first and second PUSCH ports are either PUSCH ports 1000 and 1002, respectively, or are PUSCH ports 1001 and 1003, respectively.

Example 10 includes the method of example 1, further comprising: identifying a first mapping that maps a first antenna port to the first transmission layer, identifying a second mapping that maps the first codeword to the first antenna port; and mapping the first codeword to the first transmission layer based on the first and second mappings.

Example 11 includes the method of example 10, wherein the first mapping is to map a plurality of first antenna ports that includes the first antenna port to the first transmission layer.

Example 12 includes the method of example 10, wherein the first mapping is to further map a third antenna port to a third transmission layer and the second mapping is to map the first codeword to a plurality of antenna ports that include a common polarization, the plurality of antenna ports to include the first antenna port and the second antenna port.

Example 13 includes the method of example 1, further comprising: identifying a mapping scheme from a plurality of available mapping schemes; and mapping the first codeword to the first transmission layer and the second codeword to the second transmission layer based on the mapping scheme.

Example 14 includes the method of example 13, further comprising: receiving a mapping configuration from a network via radio resource control signaling or scheduling downlink control information; and identifying the mapping scheme based on the mapping configuration.

Example 15 includes the method of example 13, further comprising: identifying the mapping scheme based on whether a physical uplink shared channel (PUSCH) transmission that includes the first and second codewords is to be transmitted with a non-coherent precoder, a partially-coherent precoder, or a fully-coherent precoder.

Example 16 includes the method of example 1, further comprising: receiving one or more sounding reference signal (SRS) indicators (SRIs); and mapping the first codeword to the first transmission layer and the second codeword to the second transmission layer based on the one or more SRIs.

Example 17 includes a method of operating a device, the method comprising: determining a plurality of phase-tracking reference signal (PTRS) ports are scheduled; identifying one or more codewords, the one or more codewords associated with respective modulation and coding schemes (MCSs); mapping the plurality of PTRS ports to the one or more codewords; determining, based on the MCSs respectively associated with the one or more codewords, one or more densities for the plurality of PTRS ports; and providing PTRSs on the plurality of PTRS ports based on the one or more densities.

Example 18 includes the method of example 17, further comprising: mapping a first PTRS port of the plurality of PTRS ports to a first codeword that is associated with a first MCS; and determining a first density for the first PTRS port based on the first MCS.

Example 19 includes the method of example 17, further comprising: determining a common density for the plurality of PTRS ports, wherein the common density is based on: a lowest modulation and coding scheme (MCS) associated with the one or more codewords or a highest MCS associated with the one or more codewords; or an equivalent MCS across transmission layers that is calculated based on an actual spectrum efficiency.

Example 20 includes the method of example 17, further comprising: calculating a spectrum efficiency for a physical uplink shared channel (PUSCH) transmission based on the MCSs associated with the one or more codewords; selecting an equivalent MCS based on the spectrum efficiency; and determining a common density for the plurality of PTRS ports, based on the equivalent MCS.

Example 21 includes the method of example 17, further comprising: determining a first PTRS is mapped to a first codeword; determining at least two layers are mapped to the first codeword; and associating the first PTRS with one demodulation reference signal (DMRS) port, the one DMRS port associated with one of the at least two layers.

Example 22 includes the method of example 17, wherein a first PTRS port of the plurality of PTRS ports is mapped to at least two codewords, the at least two codewords respectively associated with at least two MCSs, the method further comprising: determining a first density for the first PTRS port based on a highest MCS of the at least two MCSs, a lowest MCS of the at least two MCSs, or an equivalent MCS that is calculated based on the at least two MCSs.

Example 23 includes the method of example 17, wherein first and second PTRS ports of the plurality of PTRS ports are mapped to a first codeword of the at least two codeword, the first codeword associated with a first MCS, and the method further comprises: determining a density for the first and second PTRS ports based on the first MCS.

Example 24 includes the method of example 17, wherein the at least two codewords has M codewords, where M is a first integer, the plurality of PTRS ports has N PTRS ports, where N is a second integer that is greater than the first integer, and the method further comprises: determining a common density for the N PTRS ports based on a highest MCS associated with the M codewords, a lowest MCS associated with the M codewords, or an equivalent MCS that is calculated based on all MCSs that are respectively associated with the M codewords.

Example 25 includes the method of example 17, wherein a first PTRS port of the plurality of PTRS ports is mapped to first and second codewords, the first codeword to be transmitted on one or more first transmission layers with a first MCS, the second codeword to be transmitted on one or more second transmission layers with a second MCS, and the method further comprises: receiving an associated layer index in downlink control information; and associating the first PTRS port with one transmission layer selected from the one or more first transmission layers and the one or more second transmission layers based on the associated layer index.

Example 26 includes the method of example 17, wherein a first PTRS port of the plurality of PTRS ports is mapped to first and second codewords, the first codeword to be transmitted on one or more first transmission layers with a first MCS, and the second codeword to be transmitted on one or more second transmission layers with a second MCS, the method further comprising: associating the first PTRS port with one transmission layer selected from either the one or more first transmission layers or the one or more second transmission layers.

Example 27 includes the method of example 26, further comprising: selecting the first MCS based on: configuration signaling from a network, a determination that the first MCS is higher or lower than the second MCS; or, if the first MCS is equal to the second MCS, a determination that the first MCS is associated with a codeword index or layer index that is lower than a codeword index or layer index associated with the first MCS; and associating the first PTRS port with one transmission layer selected from the one or more first transmission layers based on said selecting of the first MCS.

Example 28 includes the method of operating a next generation node B (gNB), the method comprising: receiving a capability indication from a user equipment (UE), the capability indication to indicate that the UE supports uplink transmissions with a plurality of codewords; transmitting configuration information to the UE to enable uplink transmissions with more than one codeword; and scheduling a physical uplink shared channel transmission with a plurality of codewords to be transmitted on at least two transmission layers.

Example 29 includes the method of example 28, further comprising: transmitting, to the UE, an indication of a codeword-to-layer mapping scheme.

Example 30 includes the method of example 29, wherein the codeword-to-layer mapping scheme is based on a consecutive layer split, a PTRS port-to-layer mapping, or a layer-to-antenna mapping.

Example 31 includes the method of example 28, wherein the configuration information is specific to the UE, to a serving cell provided by the gNB, a bandwidth part, or a control resource set.

Example 32 may include an apparatus comprising means to perform one or more elements of a method described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 may include an apparatus comprising logic, modules, or circuitry to perform one or more elements of a method described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-31, or portions thereof.

Example 37 may include a signal as described in or related to any of examples 1-31, or portions or parts thereof.

Example 38 may include a datagram, information element, packet, frame, segment, PDU, or message as described in or related to any of examples 1-31, or portions or parts thereof, or otherwise described in the present disclosure.

Example 39 may include a signal encoded with data as described in or related to any of examples 1-31, or portions or parts thereof, or otherwise described in the present disclosure.

Example 40 may include a signal encoded with a datagram, IE, packet, frame, segment, PDU, or message as described in or related to any of examples 1-31, or portions or parts thereof, or otherwise described in the present disclosure.

Example 41 may include an electromagnetic signal carrying computer-readable instructions, wherein execution of the computer-readable instructions by one or more processors is to cause the one or more processors to perform the method, techniques, or process as described in or related to any of examples 1-31, or portions thereof.

Example 42 may include a computer program comprising instructions, wherein execution of the program by a processing element is to cause the processing element to carry out the method, techniques, or process as described in or related to any of examples 1-31, or portions thereof.

Example 43 may include a signal in a wireless network as shown and described herein.

Example 44 may include a method of communicating in a wireless network as shown and described herein.

Example 45 may include a system for providing wireless communication as shown and described herein.

Example 46 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor comprising:
   processing circuitry to:
     receive configuration information from a base station, the configuration information to indicate at least two codewords are enabled for uplink transmissions;
     receive scheduling information to schedule an uplink transmission;
     identify a first mapping between a first phase-tracking reference signal (PTRS) port and a first transmission layer;
     identify a second mapping between a first codeword and the first PTRS port; and
     map the first codeword to the first transmission layer based on the first and second mappings;
     map, based on the scheduling information and configuration information, a second codeword to a second transmission layer; and
     generate the first codeword for transmission with the first transmission layer and the second codeword with the second transmission layer; and
   interface circuitry coupled with the processing circuitry, the interface circuitry to enable communication.

2. The baseband processor of claim 1, wherein the processing circuitry is further to:
   map the first codeword to a plurality of first transmission layers that includes the first transmission layer; and
   map the second codeword to a plurality of second transmission layers that includes the second transmission layer.

3. The baseband processor of claim 1, wherein the configuration information comprises user equipment-specific configuration information, serving cell configuration information, bandwidth part configuration information, or control resource set configuration information.

4. The baseband processor of claim 1, wherein the processing circuitry is further to:
   generate a capability indication to be transmitted to indicate that a user equipment supports more than one codeword for uplink transmissions.

5. The baseband processor of claim 1, further wherein the processing circuitry is further to:
   receive a mapping configuration in radio resource control (RRC) signaling or in a media access control (MAC) control element (CE); and
   identify the first mapping based on the mapping configuration.

6. The baseband processor of claim 1, wherein the first mapping is between the first PTRS port and both the first transmission layer and a third transmission layer and to identify the first mapping between the first PTRS port and the first and third transmission layers comprises:
   determine the first transmission layer is mapped to a first physical uplink shared channel (PUSCH) port;
   determine the third transmission layer is mapped to a second PUSCH port; and
   determine the first PTRS port is mapped to both the first and second PUSCH ports.

7. The baseband processor of claim 6, wherein to determine the first PTRS port is mapped to both the first and second PUSCH ports comprises:
   receive a sounding reference signal (SRS) indicator (SRI) that identifies an SRS resource configuration;

determine the SRS resource configuration includes a PTRS index that corresponds to the first PTRS port; and determine that the first PTRS port is mapped to both the first and second PUSCH ports based on a determination that the first and second PUSCH ports are associated with SRS resources provided by the SRS resource configuration.

8. The baseband processor of claim 6, wherein to determine the first PTRS port is mapped to both the first and second PUSCH ports comprises:

determine, based on one or more precoding matrixes, the first transmission layer is mapped to the first PUSCH port and the second transmission layer is mapped to the second PUSCH port based on one or more precoding matrixes in a codebook, wherein the first and second PUSCH ports are either PUSCH ports 1000 and 1002, respectively, or are PUSCH ports 1001 and 1003, respectively.

9. A baseband processor comprising:

processing circuitry to:

receive configuration information from a base station, the configuration information to indicate at least two codewords are enabled for uplink transmissions;

receive scheduling information to schedule an uplink transmission;

identify a mapping scheme from a plurality of available mapping schemes;

map a first codeword to a first transmission layer and a second codeword to a second transmission layer based on the mapping scheme, the scheduling information, and the configuration information, wherein the mapping scheme is identified based on a mapping configuration from a network or based on whether a physical uplink shared channel (PUSCH) transmission that includes the first and second codewords is to be transmitted with a non-coherent precoder, a partially-coherent precoder, or a fully-coherent precoder; and generate the first codeword for transmission with the first transmission layer and the second codeword with the second transmission layer; and interface circuitry coupled with the processing circuitry, the interface circuitry to enable communication.

10. The baseband processor of claim 9, wherein the processing circuitry is further to:

identify, based on the mapping scheme, a first mapping that maps a first antenna port to the first transmission layer;

identify, based on the mapping scheme, a second mapping that maps the first codeword to the first antenna port; and map the first codeword to the first transmission layer based on the first and second mappings, wherein: the first mapping is to map a plurality of first antenna ports that includes the first antenna port to the first transmission layer; or the first mapping is to map a third antenna port to a third transmission layer and the second mapping is to map the first codeword to a plurality of antenna ports that include a common polarization, the plurality of antenna ports to include the first antenna port and a second antenna port.

11. The baseband processor of claim 9, wherein the processing circuitry is further to:

receive one or more sounding reference signal (SRS) indicators (SRIs); and map the first codeword to the first transmission layer and the second codeword to the second transmission layer based on the one or more SRIs.

12. A method comprising:

receiving a capability indication from a user equipment (UE), the capability indication to indicate that the UE supports uplink transmissions with more than one codeword;

generating configuration information to be transmitted to the UE to enable uplink transmissions with more than one codeword;

generating, for transmission to the UE, an indication of a codeword-to-layer mapping scheme, wherein the codeword-to-layer mapping scheme is based on a phase-tracking reference signal (PTRS) port-to-layer mapping; and scheduling a physical uplink shared channel transmission with a plurality of codewords to be transmitted on at least two transmission layers.

* * * * *